(12) United States Patent
Li

(10) Patent No.: US 7,796,502 B2
(45) Date of Patent: Sep. 14, 2010

(54) METHOD AND DEVICE FOR IMPLEMENTING OCH-SPRING IN WAVELENGTH DIVISION MULTIPLEXING SYSTEMS

(75) Inventor: Congqi Li, Guangdong (CN)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 713 days.

(21) Appl. No.: 10/589,522

(22) PCT Filed: Apr. 14, 2005

(86) PCT No.: PCT/CN2005/000502

§ 371 (c)(1),
(2), (4) Date: Nov. 14, 2006

(87) PCT Pub. No.: WO2005/101712

PCT Pub. Date: Oct. 27, 2005

(65) Prior Publication Data

US 2007/0195693 A1 Aug. 23, 2007

Related U.S. Application Data

(63) Continuation of application No. PCT/CN2005/000502, filed on Apr. 14, 2005.

(30) Foreign Application Priority Data

Apr. 14, 2004 (CN) .......................... 2004 1 0034507

(51) Int. Cl.
*H04J 3/14* (2006.01)
(52) U.S. Cl. ...................................................... 370/222
(58) Field of Classification Search ................. 370/222, 370/223, 224
See application file for complete search history.

(56) References Cited

U.S. PATENT DOCUMENTS 5,903,370 A 5/1999 Johnson (Continued)

FOREIGN PATENT DOCUMENTS

DE 19946487 5/2001

(Continued)

OTHER PUBLICATIONS

Tatsuya Shiragaki et al; "Protection architecture and applications of Och shared protection ring." Optical Networks Magazine Jul./Aug. 2001.

*Primary Examiner*—Derrick W Ferris
*Assistant Examiner*—Mohammad Anwar
(74) *Attorney, Agent, or Firm*—Ladas & Parry LLP

(57) ABSTRACT

The present invention discloses a method and device for implementing Och-SPRing in Wavelength Division Multiplexing system. The method includes: in the node of the optical network system, setting two switches in each working path and its backup path that pass through the node, each of which includes two input ports and one output port; when receiving signals, controlling the first switch to selectively accept the downlink service signals sent from the working path or the backup path; when sending signals, sending the uplink service signal sent from the local device respectively to one output port of uplink direction in the working path and the second switch; controlling the second switch to choose one signal among the local uplink service signal and the downlink service signal sent from the backup path to input into the uplink direction of the backup path. The method of the present invention can largely reduce construction cost of the system, save optical power budget, and improve OSNR.

19 Claims, 5 Drawing Sheets

U.S. PATENT DOCUMENTS

| | | |
|---|---|---|
| 5,933,258 A | 8/1999 | Flanagan et al. |
| 6,701,085 B1 | 3/2004 | Muller |
| 6,968,130 B1 * | 11/2005 | Pan ................................ 398/5 |
| 7,197,241 B2 * | 3/2007 | Weston-Dawkes et al. ...... 398/5 |
| 7,356,258 B1 * | 4/2008 | Weverka et al. ................ 398/59 |
| 7,532,817 B1 * | 5/2009 | Ko ................................ 398/7 |
| 2001/0038473 A1 * | 11/2001 | Li et al. ........................ 359/110 |
| 2004/0190901 A1 * | 9/2004 | Fang ............................ 398/59 |

FOREIGN PATENT DOCUMENTS

| | | |
|---|---|---|
| DE | 10126334 | 12/2002 |
| WO | WO02069540 | 9/2002 |

* cited by examiner

METHOD AND DEVICE FOR IMPLEMENTING OCH-SPRING IN WAVELENGTH DIVISION MULTIPLEXING SYSTEMS

CROSS-REFERENCE

This application is a continuation application of International Application No. PCT/CN2005/000502, filed Apr. 14, 2005, which claims priority to Chinese Patent Application No. 200410034507.5, filed Apr. 14, 2004.

FIELD OF THE TECHNOLOGY

The present invention relates to Wavelength Division Multiplexing (WDM) technologies, and more particularly, to a method and devices for implementing Och-SPRing in a Wavelength Division Multiplexing system.

BACKGROUND OF THE INVENTION

Along with the development of communication technologies, the applications of the WDM have gradually turned from long distance communications to Metropolitans. Due to transparent features of the optics, the WDM can provide bearer channels for many services, e.g. Asynchronous Transfer Mode (ATM), Internet Protocol (IP), Synchronous Digital Hierarchy (SDH) and Synchronous Optical Networking (SONET), etc., therefore, it is usually found that, many non-SDH, non-SONET services are transmitted directly on a certain wavelength of the WDM. However, unexpected malfunctions on optical cables will emerge due to diversified city constructions, e.g. road constructions, pipeline constructions, and etc. Self-Healing Network schemes are adopted for the SDH and the SONET services on the SDH and SONET devices, which can effectively avoid the negative influence resulting from the optical cable failures on the services. However, the non-SDH, non-SONET services, the deficiency of protection measures usually result in service lost for a long time after the optical cable breaks off, which directly brings huge economical losses and pressures to the operators. Therefore, in order to improve the survivability and the reliability of the network, protection and recovery schemes are usually adopted in the WDM system.

In the Metropolitan WDM applications, in order to improve the overall survivability of the network, several Optical Add-Drop Multiplexing (OADM) sites are usually combined into a ring network. The survivability of the WDM ring network is improved through protection methods which are similar to those in the SDH ring network. Common protection schemes in the WDM ring network include Optical Unidirectional Path Switched Ring (OUPSR), Optical Bi-directional path-switched ring (OBPSR), Optical Unidirectional Line-Switched Ring (OULSR), Optical Bi-directional Line Switched Ring (OBLSR) and Optical Sub Network Connection Protection (OSNCP). All these methods have their own advantages and disadvantages. For instance, although both of the OUPSR and the OBPSR can improve the network survivability, their wavelength utilization efficiencies are relatively lower. The familiar OBLSR can properly improve the wavelength utilization efficiency, however, due to its circular protection characteristic, signals have to be transmitted over a long path, and therefore, it is necessary for the system to reserve sufficient margins in Optical Signal to Noise Ratio (OSNR) budgets, which directly limits the transmission specs of the system. As to the OULSR, it has a low wavelength utilization efficiency, and simultaneously, disadvantages of the OBLSR still exist in the OULSR, so it is not very suitable for the applications of the WDM ring network; the OSNCP is usually called as dual transition selective reception protection or 1+1 Optical Transformation Unit (OTU) protection in the WDM ring network, the wavelength utilization efficiency is also relatively lower for the reason that working wavelengths and backup wavelengths take different paths.

At present, based on the OBPSR, there appears a new protection scheme—an Optical Channel Shared Protection Ring (Och-SPRing), which can be described as follows: a same bi-directional service connection is born by a same pair of optical signals with wavelengths of $\lambda 1$ and $\lambda 2$ on different segments of a topological ring. The pair of the optical signals $\lambda 1$ and $\lambda 2$ are transmitted in two different optical fibers. Their wavelengths are taken as working wavelengths. In addition, another corresponding pair of wavelengths $\lambda 1$ and $\lambda 2$ in the two optical fibers is taken as protection wavelengths for the working wavelengths $\lambda 1$ and $\lambda 2$. Under normal conditions, the working wavelength is used to bear services, therefore, the working wavelength is also called a working channel, while the protection wavelength functions as a backup, and it is called as a backup channel. The scheme allows to bear various bi-directional connections using the same wavelength pair on different segments of the ring, and the same wavelength pair, which implements the different connections, can use the same pair of backup wavelength channels as the backup channels, and thereby improve the wavelength utilization efficiency. Moreover, all the switchings of the Och-SPRing occur directly between transmit ends and receive ends without ring back, therefore, the system can make its OSNR budget simply based on long paths, which avoids too much margins reserved for the system, and improves the transmission specs.

Most of the existing Och-SPRings are implemented by cross connection units, which means that, demultiplexing the optical signal into several optical wavelength signals and then connecting to the Optical Space Division Cross Connection unit together with local signals, while at the other side, connecting with local downstream signals and a subsequent Optical Signal Multiplexing unit, and completing the re-combination of the optical channels through the cross connection in the middle, and thereby achieving the objective of sharing optical path protection. However, the method needs to demultiplex the optical signals in a lump, and employs the cross connection unit in the course; therefore, it increases the optical power budget of the signals and deteriorates the OSNR. On the other hand, it results in exorbitant costs for initial constructions of the network. However, at early stage of its operation, operators usually require higher efficiency and reliability of the network instead of network capacities. Therefore, the large and all-inclusive protection scheme can hardly meet the practical requirements of the operators.

SUMMARY OF THE INVENTION

The present invention provides a connection switching device for implementing the Och-SPRing. The device is used in nodes of an optical network system with a working path and a backup path, which includes:

two switches, each of which has two input ports and one output port, and one of the input ports can be chosen to connect with the output port under the control of a switch;

one input port of the first switch connects to a downlink direction of the working path, the other input port connects to the downlink direction of the backup path, and the output port connects to a local drop path;

One input port of the second switch connects to a local add path, the other input port connects to the downlink direction of the backup path and the output port connects to the uplink direction of the backup path;

the local add path is connected with the uplink direction of the working path at the same time.

The present invention also discloses a switching device for implementing the Och-SPRing, the device is applied in unidireactional services drop function of the node in the optical network system with the working path and the backup path, which includes:

the first switch, which has two input ports and one output port, and one of the input ports can be connected to the output port under the control of the switch; one input port of the first switch connects to a downlink direction of the working path, the other input port connects to the downlink direction of the backup path, and the output port connects to a local drop path;

the second switch, which has one input port and one output port, and the input port can be open or close to the output port under the control of the switch; the input port of the second switch connects to the downlink direction of the backup path, the output port connects to the uplink direction of the backup path.

The present invention provides a third connection switching device for implementing the Och-SPRing, the device is applied in unidireactional services add function of the node in the optical network system with the working path and the backup path, comprising:

a switch, which has two input ports and one output port, and one of the input ports can be connected to the output port under the control of the switch; one input port of the switch connects to the local add path, the other input port connects to the downlink direction of the backup path, and the output port connects to the uplink direction of the backup path;

the local add path is connected to the uplink direction of the working path at the same time.

The present invention also discloses an optical network system for implementing the Och-SPRing, which includes a bi-directional working path and a bi-directional backup path;

a bi-directional service transmission-reception node in the system includes two identical connection switching devices, each of which connects with the working path and the backup path of the working path in one direction by the same connection method. Each of the connection switching device includes: two switches, each of which has two input ports and one output port, and one of the input ports can be chosen to connect with the output port under the control of a switch; one input port of the first switch connects to a downlink direction of the working path, the other input port connects to the downlink direction of the backup path, and the output port connects to a local drop path; one input port of the second switch connects to a local add path, the other input port connects to the downlink direction of the backup path and the output port connects to the uplink direction of the backup path; the local add path is connected with the uplink direction of the working path at the same time.

An unidireactional service transmission-reception node in the system comprises one connection switching device used for unidireactional service drop, and one connection switching device used for unidireactional service add;

the connection switching device used for unidireactional service drop includes: the first switch, which has two input ports and one output port, and one of the input ports can be chosen to connect with the output port under the control of the switch; one input port of the first switch connects to a downlink direction of the working path, the other input port connects to the downlink direction of the backup path, and the output port connects to a local drop path; the second switch, which has one input port and one output port, and the input port can be open or close to the output port under the control of the switch; the input port of the second switch connects to the downlink direction of the backup path, the output port connects to the uplink direction of the backup path.

The connection switching device used for unidireactional service add includes: one switch, which has two input ports and one output port, and one of the input ports can be chosen to connect with the output port under the control of the switch; one input port of the switch connects to the local add path, the other input port connects to the downlink direction of the backup path, and the output port connects to the uplink direction of the backup path; the local add path is connected to the uplink direction of the working path at the same time.

The present invention also discloses a method for implementing the Och-SPRing, which can be applied to the optical network system with the working path and the backup path. The method includes:

when receiving the signals, controlling the first switch to receive the downlink service signals from the working path or the backup path;

when transmitting the signals, transmitting the uplink service signals from the local device respectively to the uplink direction of the working path and one of the input ports of the second switch; controlling the second switch to choose one path of the signals from the local uplink service signals and the downlink service signals from the backup path, input the selected signals to the uplink direction of the backup path.

It can be seen from the above descriptions that, the devices and the method for implementing the Och-SPRing according to the present invention need not to set the cross connection unit in the node. Instead, the present invention adopts simple switch apparatus to implement the connection and the switch required by the Och-SPRing, which simplifies the architecture of the device; moreover, the number of the connection switching devices in the node is optional, and the devices can be assembled discretionarily, which is relatively flexible. The connection switching devices can be added to or removed from the node according to the requirement of the system. Furthermore, a part of the signals can be de-multiplexed from the optical signals in the node, and be input to the corresponding connection switch unit, instead of being de-multiplexed in a lump. Therefore, the method reduces the construction cost of the system to the largest extent, saves the optical power budget, and improves the OSNR.

DETAILED DESCRIPTION OF THE INVENTION

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The invention will be described in detail hereinafter with reference to the accompanying drawings.

It is well-known that, in order to implement the Och-SPRing, all the participating nodes in the WDM system must support the following three functions: service express, service add and service drop.

The service express refers to cases that protection services of other stations can pass through the present station directly to ensure the services are accurately and precisely transmitted to the destination nodes.

The service add refers to that the service can be accurately switched to the backup path once the local service is affected.

The service drop refers to that the service whose destination is the local station can be transmitted to the local station through the backup path once the service is affected in the working path, and the service in the backup path can be accurately imported to the local receiver at the local station.

Figure 1:
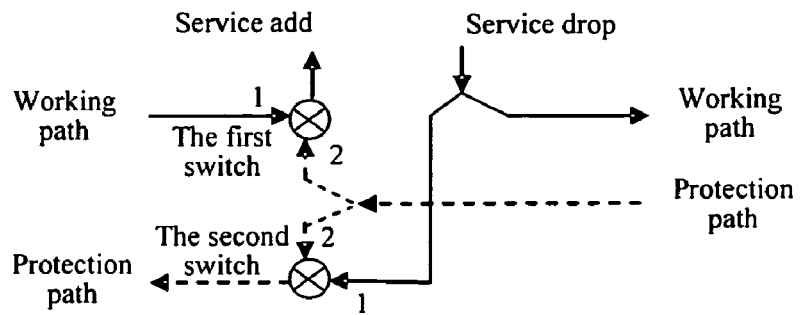
FIG. 1 is a schematic diagram illustrating the architecture of a connection switching device for implementing the Och-SPRing in accordance with a preferred embodiment of the present invention.

To achieve the above Och-SPRing, the structure of the connection switching device in an embodiment of the present invention is shown in FIG. 1. The device includes two switches, each of which has two input ports and one output port, and only one of the two input ports can receive the optical signals and output the signals from the output port at one time. It is possible to switch between the two input ports under the control of the switch.

Wherein, the input port 1 of the first switch connects to the downlink direction of the working path, the input port 2 connects to the downlink direction of the backup path, and the output port of the first switch connects to the local drop path; the local add path is connected to the downlink direction of the working path and the input port 1 of the second switch respectively, the input port 2 of the second switch and the input port 2 of the first switch connect to the downlink direction of the backup path together, and the output port of the second switch connects to the uplink direction of the backup path.

Under the normal modes, the first switch chooses to open the input port 1 to the output port, thus the downlink service signals from the working path are directly input to the local drop path, and received by the local station; meanwhile, the uplink service signals of the local station are input to the uplink direction of the working path, and transmitted to the downstream nodes.

When the node enters the express modes, the second switch chooses to open the input port 1 to the output port, ensuring the downlink services from the backup path to continue to be transmitted along the same direction, and thereby achieve the express of the node.

When a malfunction occurs in downlink direction of the working path, which affects the downlink services sent to the node, the node needs to enter the service drop modes. The first switch selects to open the input port 2 to the output port, and switches the downlink service signals from the backup path to the local drop path, realizing the local drop function and ensuring the normal reception of service signals.

When a malfunction occurs in uplink direction of the working path, which affects the uplink services output from the node, the node needs to enter the service add modes. The second switch selects to open the input port 1 to the output port, to transmit the uplink service signals from the local add path through the backup path, realizing the local add function.

Figure 2:
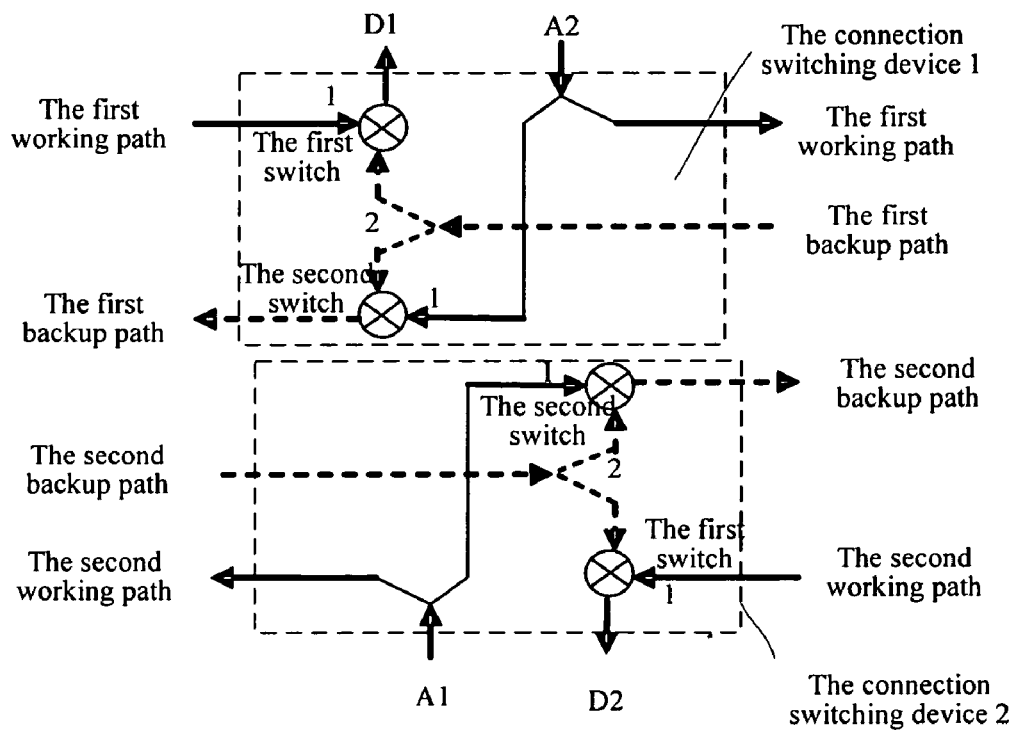
FIG. 2 is a schematic diagram illustrating the architecture of a connection switching device in the bi-directional service node.

In bi-directional services, the function can be implemented in the node with two independent connection switching devices, the architecture is shown as FIG. 2. Generally, the first working path and the second working path adopt different wavelengths $\lambda 1$ and $\lambda 2$, and are transmitted in different optical fiber lines respectively; the first backup path that protects the first working path adopts the wavelength $\lambda 1$ to transmit signals in the optical fiber line where the second working path locates, while the second backup path that protects the second working path adopts the wavelength $\lambda 2$ to transmit signals in the optical fiber where the first working path locates. The connection switching device 1 is configured for connecting and switching the services from the West to the East under normal conditions; and the connection switching device 2 is configured for connecting and switching the services from the West to the East under normal conditions.

Under normal conditions, the first switch of connection switching device 1 selects to open the input port 1, and inputs the downlink service signals from the first working path in the west to the local drop path D1; inputs the uplink service signals, whose destination is the first optical channel in the east, from the local add path A2 to the first uplink direction of the working path. The first switch of connection switching device 2 selects to open the input port 1, and inputs the downlink service signals from the second working path in the east into the local drop path D2; inputs the uplink service signals, whose destination is the second optical channel in the west, from the local add path A1 to the uplink direction of the second working path.

Under the express modes, the second switch of connection switching device 1 selects to open the input port 1 to the output port, thereby the downlink service signals from the first backup path in the east can be continuously transmitted along the same direction. The second switch of connection switching device 2 selects to open the input port 1 to the output port, thereby the downlink service signals from the second backup path in the west can be continuously transmitted along the same direction.

Under the service drop modes, the first switch of the connection switching device 1 selects to open the input port 2 to the output port, thereby the downlink service signals from the first backup path in the east can be switched to the local drop path D1. The first switch of the connection switching device 2 selects to open the input port 2 to the output port, and thereby the downlink service signals from the second backup path in the west can be switched to the local drop path D2.

Under the service add modes, the second switch of the connection switching device 1 selects to open the input port 1 to the output port, thereby the uplink service signals from the local add path A2 can be transmitted through the first backup path. The second switch of the connection switching device 2 selects to open the input port 1 to the output port, and thereby the uplink service signals from the local add path A1 can be transmitted through the second backup path.

The connection switching device 1 and the connection switching device 2 in FIG. 2 are independent to each other, therefore, in practical applications, the connection switching device 1 and the connection switching device 2 can implement the three modes of switch operations, i.e. the service express, the service add and the service drop, independently, which can further improve the flexibility of the network protection.

It is obvious that, one pair of wavelengths can only be used once at the same segment of the ring, therefore, only one pair of the bi-directional connect service of the pair of wavelengths will be affected by one malfunction on the ring. There will never appear the case when both of the two pairs of service connections need to be switched simultaneously, which will result in the wavelength conflict.

Figure 3:
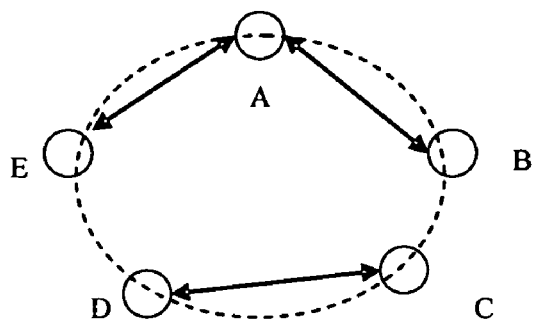
FIG. 3 is a schematic diagram illustrating the topology structure of a optical ring network with non-uniform distributed services.
Figure 4A:
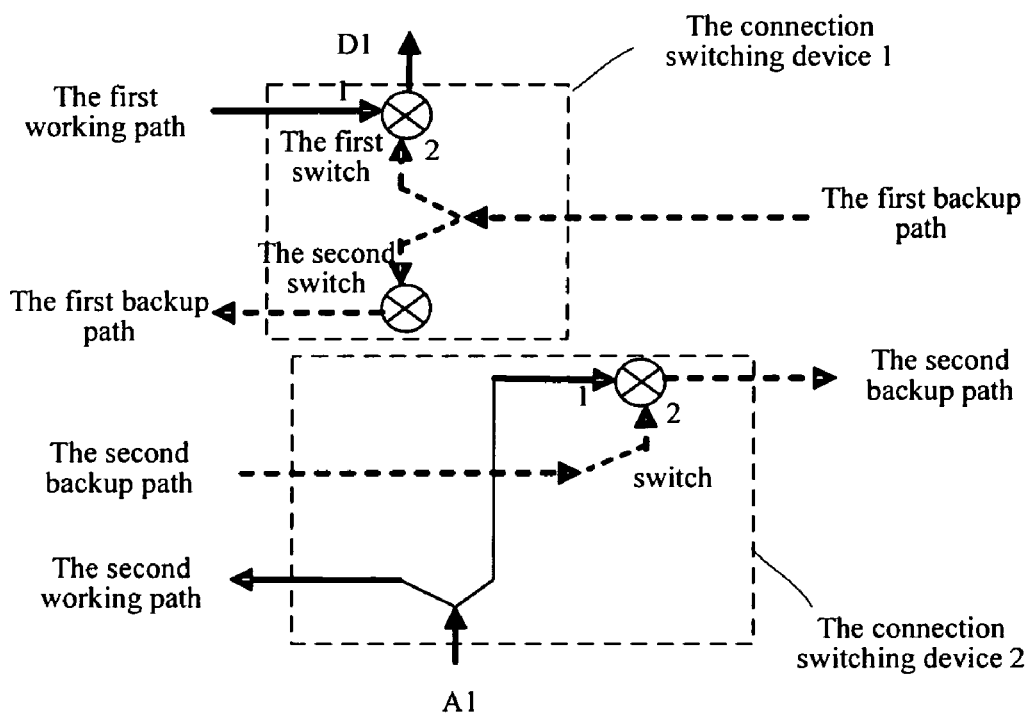
FIG. 4A is a schematic diagram illustrating the architecture of a connection switching device for implementing the unidireactional service add and drop function.
Figure 4B:
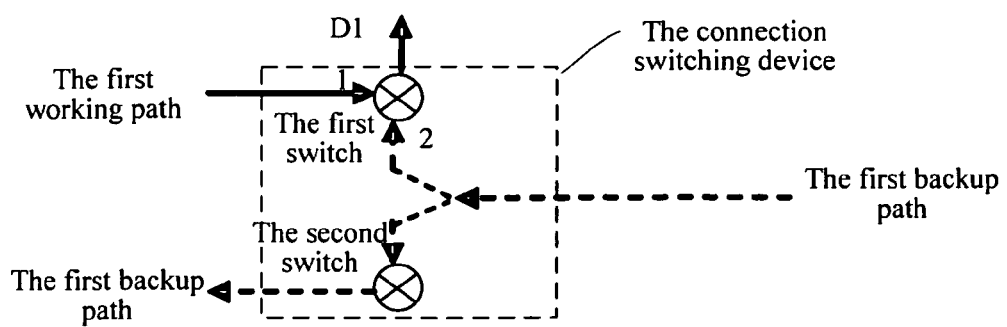
FIG. 4B is a schematic diagram illustrating the architecture of a connection switching device for dropping services.
Figure 4C:
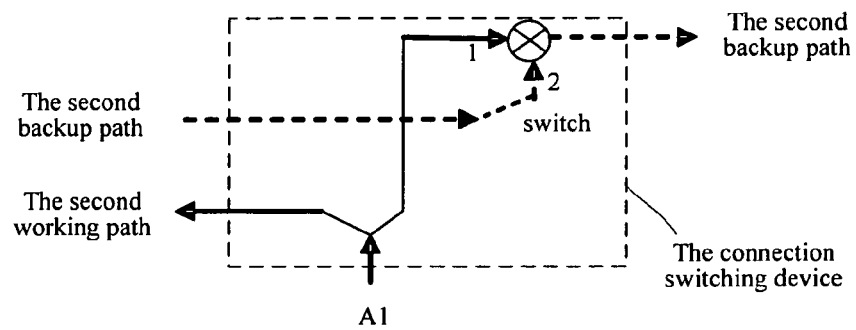
FIG. 4C is a schematic diagram illustrating the architecture of a connection switching device for adding services.

In the metropolitan optical network, the distribution of the services is not always uniform, as shown in FIG. 3, except for the point A, services in all the other nodes in the whole ring network are unsymmetrical, the service add/drop only exists in one direction, therefore, under such circumstances, the preferred embodiment of the present invention provides a connection switching device as shown in FIG. 4A~4C.

The service add/drop only exists in one direction in the node in FIG. 4A. There are two connection switching devices in the node, wherein, the connection switching device 1 is used for connecting and switching the downlink services from the west into the local stations under normal conditions; the connection switching device 2 is used for connecting and switching the uplink services from the local stations to the west under normal conditions.

The connection switching device 1 includes the first switch and the second switch. The first switch, which has two input ports and one output port, and the input ports can be controlled to switch to each other; the input port 1 of the first switch connects to the downlink direction of the first working path, the input port 2 connects to the downlink direction of the first backup path, and the output port connects to the local drop path D1; the second switch has one input port and one output port, and the input port can be controlled to be open or close to the output port. The input port of the second switch connects to the downlink direction of the first backup path. The output port connects to the uplink direction of the first backup path.

The connection switching device 2 includes one switch, which has two input ports and one output port, and the two input ports can be controlled to switch to each other. The input port 1 of the switch connects to the local add path A1, the output port 2 connects to the downlink direction of the second backup path, the output port connects to the uplink direction of the second backup path, and meanwhile, the local add path A1 is connected to the uplink direction of the second working path.

Under normal conditions, the first switch of connection switching device 1 selects to open the input port 1, and inputs the downlink service signals from the first working path in the west to the local drop path D1; in the connection switching device 2, input the uplink service signals, whose destination is the second optical channel in the west, from the local add path A1 to the uplink direction of the second working path.

Under the express modes, the second switch of connection switching device 1 selects to open the input port 1 to the output port, thereby the downlink service signals from the first backup path in the east can be continuously transmitted along the same direction. The second switch of connection switching device 2 selects to open the input port 1 to the output port, thereby the downlink service signals from the second backup path in the west can be continuously transmitted along the same direction.

Under the service drop modes, the first switch of the connection switching device 1 selects to open the input port 2 to the output port, thereby the downlink service signals from the first backup path in the east can be switched to the local drop path D1.

Under the service add modes, the switch of the connection switching device 2 selects to open the input port 1 to the output port, thereby the uplink service signals from the local add path A1 can be transmitted through the second backup path.

The connection switching device 1 and the connection switching device 2 in FIG. 2 are independent to each other, therefore, in practical applications, the connection switching device 1 and the connection switching device 2 can implement the three modes of switch operations, i.e. the service express, the service add and the service drop, independently, which can further improve the flexibility of the network protection.

In the ring network there are also some nodes which have no add/drop on the wavelength, in the case, the node can be seen as a transparent node, i.e. the node will not participate any Och-SPRing function of the wavelength pair, and will not do any operations on the wavelength pair, either.

If there is only the unidireactional service drop without the service add in the node, then the structure of the connection switching device is shown in FIG. 4B. The node only needs to complete the service drop, and the service express is still supported by the local station at the same time.

The structure is the same as that in FIG. 4A, i.e., it includes the first switch and the second switch. The first switch has two input ports and one output port. The input port 1 of the first switch connects to the downlink direction of the first working path, the input port 2 connects to the downlink direction of the first backup path, and the output port connects to the local drop path D1; the second switch has one input port and one output port. The input port of the second switch connects to the downlink direction of the first backup path, and the output port connects to the uplink direction of the first backup path.

Under normal conditions, the first switch selects to open the input port 1, and inputs the downlink service signals from the first working path in the west to the local drop path D1.

Under the express modes, the second switch selects to open the input port to the output port, thereby the downlink service signals from the first backup path in the east can be continuously transmitted along the same direction.

Under the service drop modes, the first switch selects to open the input port 2 to the output port, thereby the downlink service signals from the first backup path in the east can be switched to the local drop path D1.

Under service drop modes, the first switch selects output port 2 to connect with the output port, and switches the downlink service signal sent from the first backup path in the east to local drop path D1.

If there is only the unidireactional service add without the service drop in the node, then the structure of the connection switching device is shown in FIG. 4C. The node only needs to complete the service add, and the service express is still supported by the local station at the same time.

The structure is the same as that of the connection switching device 2 shown in FIG. 4A, i.e. it includes one switch, which has two input ports and one output port. The input port 1 of the switch connects to the local add path A1, the output port 2 connects to the downlink direction of the second backup path, the output port connects to the uplink direction of the second backup path, and meanwhile, the local add path A1 is connected to the uplink direction of the second working path.

Under normal conditions, input the uplink service signals, which is to be transmitted to the west, in the second optical channel from the local add path A1 to the uplink direction of the second working path.

Under the express modes, the switch selects to open the input port 1 to the output port, thereby the downlink service signals from the second backup path in the west can be continuously transmitted along the same direction.

Under the service add modes, the switch selects to open the input port 1 to the output port, thereby the uplink service signals from the local add path A1 can be transmitted through the second backup path.

In all of the above embodiments, all the switches in the connection switching device can be the optical switches, and can switch to different port under the control of the control system; however, in practice, not all of the switches have to be the optical switches to implement the procedure of connection and switch, it is also applicable to use the 1+1 protection function into OTU together with the protection switch to implement the Och-SPRing.

Figure 5:
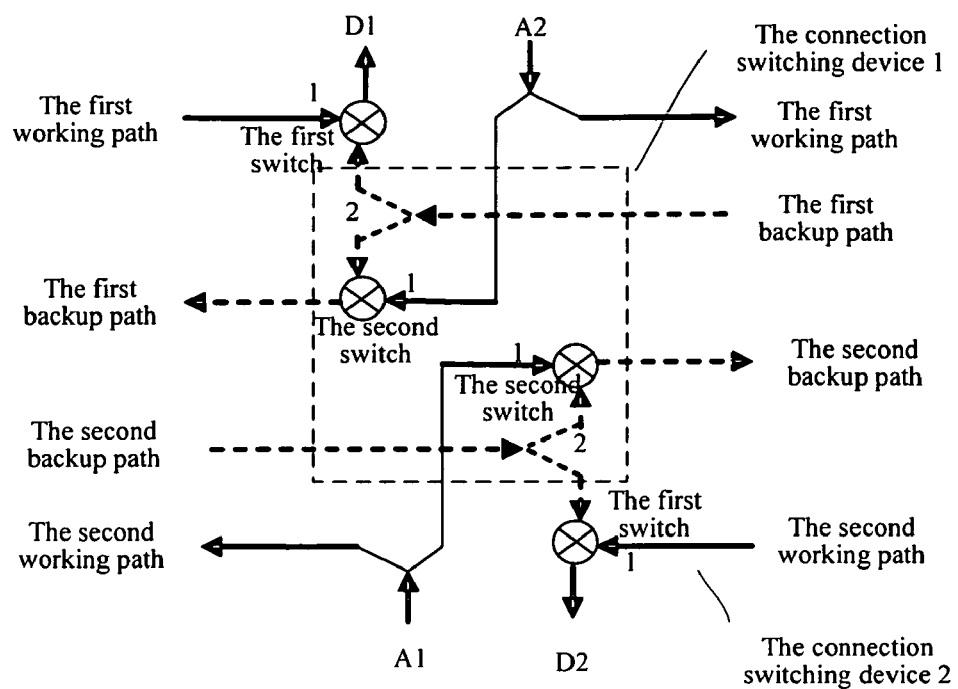
FIG. 5 is a schematic diagram illustrating the architecture of a connection switching device implemented by the optical switch and the electric switch in the bi-directional service node.

Now referring to FIG. 5, the second switch of the two connection switching devices in FIG. 5 are also the optical switch, but the first switch in the working path of the original protection device is replaced by electric switches of the 1+1 protection OTU, the downlink optical signal of the first working path and the downlink optical signal of the first backup path are simultaneously connected to two modules of the 1+1 protection OTU respectively, and then the control system determines which path of signal is effective. Meanwhile, the output port of the 1+1 protection OTU splitting the optical signal into two lines with a 3 dB optical splitter, and simultaneously feeding the signals back to the working path and the backup path. When the switches are all optical switches, the operation is completely the same. In addition, the first switch can also be replaced by a logical switch. The principles are the same.

In each of the embodiments above, signals of the service add path A1, A2 need to be transmitted to the input port 1 of the second switch and the uplink direction of the working path respectively, which can be implemented through setting a coupler among the service add path and the input port 1 of the second switch and the uplink direction of the working path, i.e., splitting the optical signals from the service add path into two paths through the coupler and then transmitting the signals to the input port 1 of the second switch and the uplink direction of the working path respectively. Wherein, a 3 dB coupler is a preferred option. In addition, it is also possible to replace the coupler with a 1×2 optical switch with one input port and two output ports. The input port of the optical switch connects to the service add path, and the two output ports connect to the input port 1 of the second switch and the uplink direction of the working path respectively. The signals from the uplink direction of the working path can select to be transmitted through the second switch or the working path under the control of the optical switch. In addition, the first optical switch can also be replaced by two OTUs.

Similarly, the coupler or the 1×2 optical switch or the OUT also can be used for signal splitting and path selection among the backup path and the input port 2 of the first switch and the input port 2 of the second switch.

In addition, the second switch of the connection switching device and the coupler or the optical switch of the backup path can also be replaced by a 2×2 optical switch. As shown in FIG. 1, the two input ports of the 2×2 optical switch connects to the local add path and the downlink direction of the protection path respectively, while the two output ports connect to the input port 2 of the first switch and the uplink direction of the protection path.

Figure 6:
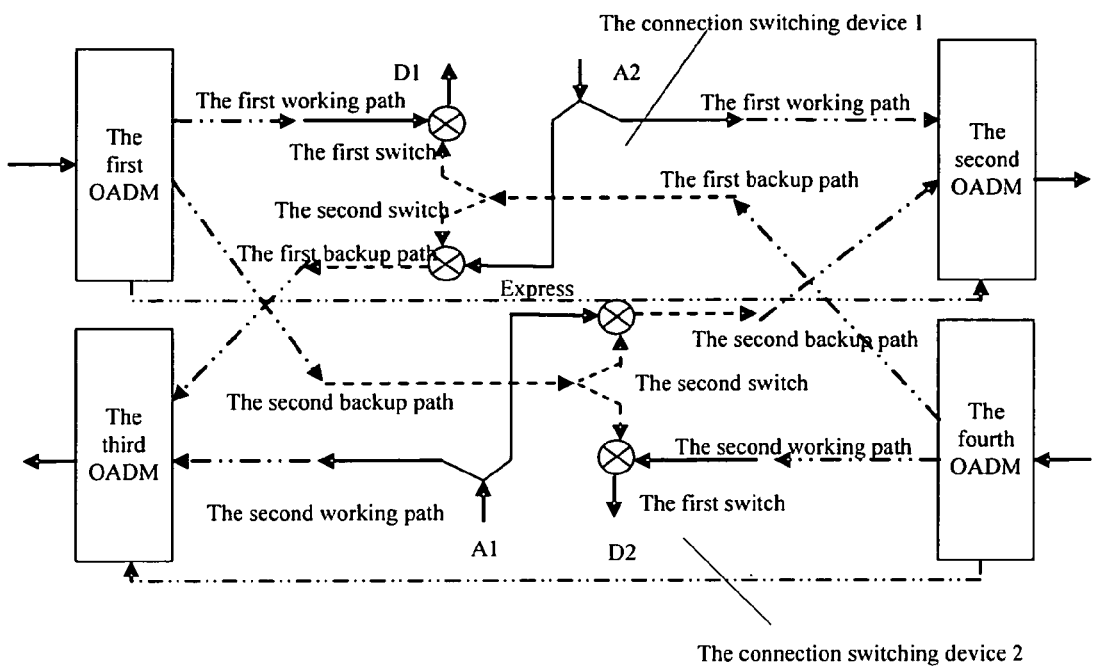
FIG. 6 is a schematic diagram illustrating the application of a connection switching device in the node of the WDM system in accordance with an embodiment of the present invention.

The practical application of the connection switching device in the node of the WDM system according to an embodiment of the present invention is shown in FIG. 6. Optical Add-Drop Multiplexing (OADM) units are usually set in the node, the OADMs connect to the transmission optical fiber of the optical network through an optical port, the OADM unit extracts the downlink signals transmitted in the optical fiber in the downlink direction according to the wavelengths, and then transmits the optical signals with different wavelengths to the corresponding working paths and protection paths; the OADM unit in the uplink direction multiplexes the uplink optical signals of the local station transmitted through the working path and the protection path, and then transmit the multiplexed signals to the transmission optical fiber in the optical network.

Specifically in FIG. 6: the input port of the first OADM unit connects to the transmission optical fiber from the west, and the two output ports of the first OADM connect to the first working path and the second protection path respectively; the input port of the fourth OADM unit connects to the transmission optical fiber from the east, and the two output ports connect with the second working path and the first protection path respectively.

The two input ports of the second OADM unit connect with the first working path and the second protection path respectively, while the output port connects to the transmission optical fiber to the east; the two input ports of the third OADM unit connect to the second working path and the first protection path respectively, while the output port connects to the transmission optical fiber to the west.

Suppose that the wavelengths of the first working path and the first backup path are the first wavelength $\lambda 1$, while the wavelengths of the second working path and the second backup path are the second wavelength $\lambda 2$.

The first OADM unit Demultiplexer multiplexes the signal of the wavelength $\lambda 1$ and the signal of the wavelength $\lambda 2$ from the mixed optical signals containing the wavelengths of $\lambda 1$ and $\lambda 2$ in the transmission optical fiber from the west, thereafter, transmits the optical signal of the wavelength $\lambda 1$ as the optical signal of the first working path to the switch corresponding to the connection switching device 1, and transmits the optical signal of the wavelength $\lambda 2$ as the optical signal of the second backup path to the switch corresponding to the connection switching device 2.

The fourth OADM unit Demultiplexer multiplexes the signal of the wavelength $\lambda 1$ and the signal of the wavelength $\lambda 2$ from the mixed optical signals containing the wavelengths of $\lambda 1$ and $\lambda 2$ in the transmission optical fiber from the east, thereafter, transmits the optical signal of the wavelength $\lambda 1$ as the optical signal of the first working path to the switch corresponding to the connection switching device 1, and transmits the optical signal of the wavelength $\lambda 2$ as the optical signal of the second backup path to the switch corresponding to the connection switching device 2.

The second OADM unit combines the optical signals of the wavelength $\lambda 1$ of the first working path from the local station to the east, and the optical signals of the wavelength $\lambda 2$ of the second backup path from the local station to the east, and then the second OADM unit transmits the mixed signals to the optical fiber to the east.

The third OADM unit combines the optical signals of the wavelength $\lambda 2$ of the first working path from the local station to the west, and the optical signals of the wavelength $\lambda 1$ of the first backup path from the local station to the west, and then the second OADM unit transmits the mixed signals to the optical fiber to the west.

As for the wavelengths which have no interactions with the local station, the service express operations can be performed through express paths, which directly connect the first and the second OADM units, and the third and the fourth OADM units.

As to the nodes with the connection switching devices as shown in FIG. 4A~4C, the structures of the nodes are similar to FIG. 6, but it is not necessary to set OADM units in the directions without input/output services.

Since self-excitations tend to appear in the optical ring network, in order to avoid the self-excitation of the ring, it is recommended in all the embodiments of the present invention that, under the normal modes, the default states of the optical switches in the working path should be connected to the working path, i.e., in all the above-mentioned embodiments, the first switches of the connection switching devices choose to open the input ports 1. And the default states of the optical switches in the backup path also choose to connect to the working path, i.e., the second switches of the connection switching devices in FIG. 1, 2, 5, 6 choose to open the input ports 1; the connection switching device 1 in FIG. 4A and the connection switching device in FIG. 4B choose to block the second switches. The connection switching device 2 in FIG. 4A and the switch of the connection switching device shown in FIG. 4C choose to open the input ports 1. Since at least two nodes in the ring network of the bi-directional Och-SPRing are involved in the protection switch of the wavelength pair, while all the backup paths select to transmit the optical path of the node in the backup path, the ring self-excitation can be avoided on the backup path. Where the ring self-excitation of the optical path penetrated the OADM, at least one parallel OADM node is still necessary in the ring network.

Since the optical switches on both of the backup path and the working path select the working path under the normal conditions, however, the transmitting-end always operates in a bridge-state under normal conditions, therefore, once a failure occurs in the line, the receiving-end can confirm the failure, and send a bridge request to the transmitting-end through the backup route. The intermediate nodes which have operations on the wavelength pair will switch the state of all the optical switches in the backup path to the backup path, therefore facilitating the optical signals from the transmitting-end to pass through the backup path and reach the destination, while the receiving-end will return a confirmation message to the transmitting-end after receiving the bridge request. And finally the receiving-end switches the optical switch in the working path to the back routes, thereby completing the entire switch process.

The foregoing description is only the preferred embodiments of the present invention, which are not used for limiting the protection scope of the present invention. Many variations are possible which remain within the concept, scope, and spirit of the invention, and these variations would become clear to those skilled in the art after perusal of this application.

The invention claimed is:

1. A connection switching device for implementing Optical Channel Shared Protection Ring (Och-SPRing), used in a node of an optical network system with a working path and a backup path, comprising:
a first switch and a second switch, each of the first switch and the second switch has two unidirectional input ports and one unidirectional output port, and one of the input ports of the first switch is connected to the output port of the first switch under the control of the first switch, one of the input ports of the second switch is connected to the output port of the second switch Under control of the second switch;
wherein one input port of the first switch connects to and receives downlink service signals from a downlink direction of the working path, the other input port of the first switch connects to and receives the downlink service signals from a downlink direction of the backup path, and the output port of the first switch connects and outputs the downlink service signals to a local drop path;
one input port of the second switch connects to and receives uplink service signals from a local add path, the other input port of the second switch connects to and receives the downlink service signals from the downlink direction of the backup path and the output port of the second switch connects to an uplink direction of the backup path; and
the local add path is connected with an uplink direction of the working path at the same time
wherein under normal modes of the connection switching device, the input port, which connects to the downlink direction of the working path, of the first switch, is connected to the output port of the first switch; under local drop modes, the input port, which connects to the downlink direction of the backup path, of the first switch, is connected to the output port of the first switch; under local add modes, the input port, which connects to the local add path, of the second switch, is connected to the output port of the second switch; and under express modes, the input port, which connects to the downlink direction of the backup path, of the second switch, is connected to the output port of the second switch.

2. The connection switching device according to claim 1, wherein the first switch and the second switch of the device can be one of the three available combinations:
both of the first and the second switches are optical switches; and, the first switch is an electric switch in an Optical Transformation Unit (OTU), and the second switch is an optical switch; and, the first switch is a logical switch, and the second switch is an optical switch.

3. The connection switching device according to claim 1, wherein the first switch and the second switch of the device can be one of the three available combinations:
both of the first and the second switches are optical switches; and, the first switch is an electric switch in an Optical Transformation Unit (OTU), and the second switch is an optical switch; and, the first switch is a logical switch, and the second switch is an optical switch.

4. A connection switching device for implementing Optical Channel Shared Protection Ring (Och-SPRing), applied in unidirectional service drop function of a node in an optical network system with a working path and a backup path, comprising: a first switch, which has two unidirectional input ports and one unidirectional output port, and one of the input ports of the first switch is connected to the output port of the first switch under control of the first switch; one input port of the first switch connects to and receives downlink service signals from a downlink direction of the working path, the other input port of the first switch connects to and receives the downlink service signals from a downlink direction of the backup path, and the output port of the first switch connects and outputs the downlink services Signals to a local drop path; and a second switch, which has one unidirectional input port and one unidirectional output port, and the input port of the second switch is open or close to the output port under the control of the second switch; the input port of the second switch connects to and receives the downlink service signals from the downlink direction of the backup path, the output port of the second switch connects and outputs the downlink service signals to an uplink direction of the backup path wherein under normal modes of the connection switching device, the input port, which connects to the downlink direction of the working path, of the first switch, is connected to the output port of the first switch; under local add modes, the input port, which connects to the downlink direction of the backup path, of the first switch, is connected to the output port of the first switch; and under express modes, the input port of the second switch, is connected to the output port of the second switch.

5. The connection switching device according to claim 4, wherein the first switch and the second switch of the connection switching device can be one of the three available combinations: both of the first and the second switches are optical switches; and, the first switch is an electric switch in an Optical Transformation Unit (OTU), and the second switch is an optical switch; and, the first switch is a logical switch, and the second switch is an optical switch.

6. The connection switching device according to claim 4, wherein the first switch and the second switch of the connection switching device can be one of the three available combinations: both of the first and the second switches are optical switches; and, the first switch is an electric switch in an Optical Transformation Unit (OTU), and the second switch is an optical switch; and, the first switch is a logical switch, and the second switch is an optical switch.

7. A connection switching device for implementing Optical Channel Shared Protection Ring (Och-SPRing), applied in unidirectional service add function of a node in an optical network system with a working path and a backup path, comprising: a switch, which has two unidirectional input ports and one unidirectional output port, and one of the input ports is connected to the output port under the control of the switch; one input port of the switch connects to and receives uplink service signals from a local add path, the other input port of the switch connects to and receives downlink service signals from a downlink direction of the backup path, and the output port of the switch connects and outputs the downlink service signals or the uplink service signals to an uplink direction of the backup path, and the local add path is connected to an uplink direction of the working path at the same time wherein:

under local add modes, the input port, which connects to the local add path, of the switch, is connected to the output port of the switch; and under express modes, the input port, which connects to the downlink direction of the backup path, of the switch, is connected to the output port of the switch.

8. The connection switching device according to claim 7, wherein: the switch is any one of an optical switch, an electric switch, and a logical switch.

9. The connection switching device according to claim 7, wherein the switch is any one of an optical switch, an electric switch, and a logical switch.

10. An optical network system for implementing Optical Channel Shared Protection Ring (Och-SPRing), comprising a bi-directional working path and a bi-directional backup path, wherein:

a bi-directional service transmission-reception node in the system comprises two identical connection switching devices, respectively connect with the working path and the backup path in one direction, and each of the connection switching devices comprises: a first switch and a second switch, each of the first switch and the second switch has two unidirectional input ports and one unidirectional output port, and one of the input ports of the first switch is connected to the output port of the first switch under the control of the first switch, one of the input ports of the second switch is connected to the output port of the second switch under control of the second switch; one input port of the first switch connects to and receives downlink service signals from a downlink direction of the working path, the other input port of the first switch connects to and receives the downlink service signals from a downlink direction of the backup path, and the output port of the first switch connects and outputs the downlink service signals to a local drop path; one input port of the second switch connects to and receives uplink service signals from a local add path, the other input port of the second switch connects to and receives the downlink service signals from the downlink direction of the backup path and the output port of the second switch connects and outputs the uplink service signals or the downlink service signals to an uplink direction of the backup path; the local add path is connected with an uplink direction of the working path at the same time; an unidirectional service transmission-reception node in the system comprises one connection switching device used for unidirectional service drop, and one connection switching device used for unidirectional service add;

the connection switching device used for unidirectional service drop comprises: a first switch, which has two unidirectional input ports and one unidirectional output port, and one of the input ports is connected to the output port under the control of the first switch; one input port of the first switch connects to and receives downlink service signals from the downlink direction of the working path, the other input port of the first switch connects to and receives the downlink service signals from the downlink direction of the backup path, and the output port of the first switch connects and output the downlink service signals to the local drop path; a second switch, which has one unidirectional input port and one unidirectional output port, and the input port of the second switch is open or close to the output port of the second switch under the control of the second switch; the input port of the second switch connects to and receives the downlink service signals from the downlink direction of the backup path, the output port of the second switch connects and outputs the downlink service signals to the uplink direction of the backup path; and the connection switching device used for unidirectional service add comprises: one switch, which has two unidirectional input ports and one unidirectional output port, and one of the input ports is connected to the output port under the control of the switch;

one input port of the switch connects to and receives the uplink service signals from the local add path, the other input port connects to and receives the downlink service signals from the downlink direction of the backup path, and the output port connects and outputs the uplink service signals or the downlink service signals to the uplink direction of the backup path; the local add path is connected to the uplink direction of the working path at the same time.

11. The optical network system according to claim 10, wherein as to the connection switching device in the bi-directional service transmission-reception node in the system, under normal modes, the input port, which connects to the downlink direction of the working path, of the first switch, is connected to the output port of the first switch; under local drop modes, the input port, which connects to the downlink direction of the backup path, of the first switch, is connected to the output port of the first switch; under local add modes, the input port, which connects to the local add path, of the second switch, is connected to the output port of the second switch; under express modes, the input port, which connects to the downlink direction of the backup path, of the second switch, is connected to the output port of the second switch;

as to the connection switching device applied in unidirectional service drop in the unidirectional service transmission-reception node in the system, under the normal modes, the input port, which connects to the downlink direction of the working path, of the first switch, is connected to the output port of the first switch; under the local add modes, the input port, which connects to the downlink direction of the backup path, of the first switch, is connected to the output port of the first switch; under the express modes, the input port of the second switch, is connected to the output port of the second switch; and as to the connection switching device applied in unidirectional service add in an unidirectional service transmission-reception node in the system, under the local add modes, the input port, which connects to the local add path, of the switch, is connected to the output port of the switch; under the express modes, the input port, which connects to the downlink direction of the backup path, of the switch, is connected to the output port of the switch.

12. The optical network system according to claim 11, wherein the first switch and the second switch of the connection switching device is one of the three available combinations:

both of the first and the second switches are optical switches; and, the first switch is an electric switch in an Optical Transformation Unit (OTU), and the second switch is an optical switch; and, the first switch is a logical switch, and the second switch is an optical switch.

13. The optical network system according to claim 10, wherein the node of the system further comprises: a first Optical Add Drop Multiplexing (OADM) unit, an input port of the first OADM unit connects with a transmission optical fiber in the optical network system, and is used for dividing optical signals input through the optical fiber according to their wavelengths, and then transmitting the signals to the working path and the backup path; and a second OADM unit, an output port of the second OADM unit connects with the transmission optical fiber in the optical network system, and is used for combining path, and then transmitting the signals to the transmission optical fiber.

14. The optical network system according to claim 13, wherein the two OADM units, which connect the same optical fiber in the system, are further directly connected with each other through a transmission path, which is used for express processing on the optical signals which have no interactions with the node.

15. The optical network system according to claim 14, wherein the first switch and the second switch of the connection switching device is one of the three available combinations:

both of the first and the second switches are optical switches; and, the first switch is an electric switch in an Optical Transformation Unit (OTU), and the second switch is an optical switch; and, the first switch is a logical switch, and the second switch is an optical switch.

16. The optical network system according to claim 13, wherein the first switch and the second switch of the connection switch device is one of the three available combinations:

both of the first and the second switches are optical switches; and, the first switch is an electric switch in an Optical Transformation Unit (OTU), and the second switch is an optical switch; and, the first switch is a logical switch, and the second switch is an optical switch.

17. The optical network system according to claim 10, wherein the first switch and the second switch of the connection switching device is one of the three available combinations:

both of the first and the second switches are optical switches; and, the first switch is an electric switch in an Optical Transformation Unit (OTU), and the second switch is an optical switch; and, the first switch is a logical switch, and the second switch is an optical switch.

18. A method for implementing Optical Channel Shared Protection Ring (Och-SPRing), applied to an optical network system with a working path and a backup path, comprising:

controlling a first switch to receive downlink service signals from the working path or the backup path-when receiving the signals, wherein the first switch has two unidirectional input ports and one unidirectional output port, one input port of the first switch connects to and receives the downlink service signals from a downlink direction of the working path, the other input port of the first switch connects to and receives the downlink service signals from a downlink direction of the backup path, and the output port of the first switch connects and outputs the downlink service signals to a local drop path;

transmitting uplink service signals received from a local device respectively to an uplink direction of the working path and one of two input ports of a second switch when transmitting the signals, wherein the second switch has two unidirectional input ports and one unidirectional output port, one input port of the second switch connects to and receives the uplink service signals from a local add path, the other input port of the second switch connects to and receives the downlink service signals from the downlink direction of the backup path and the output port of the second switch connects to the uplink direction of the backup path; the local add path is connected with the uplink direction of the working path at the same time; and controlling the second switch to choose the uplink service signals or the downlink service signals, and output the selected signals to an uplink direction of the backup path wherein under normal modes, the input port, which connects to the downlink direction of the working path, is connected to the output port of the first switch, under the control of the first switch; the signals from the downlink direction of the backup path are input to the local drop path through the first switch; the signals from the local add path are directly input to the uplink direction of the working path;

if the node needs to enter local drop modes, the input port, which connects to the downlink direction of the backup path, is connected to the output port of the first switch, under the control of the first switch; the signals from the downlink direction of the backup path are input to the local drop path through the first switch;

if the node needs to enter local add modes, the input port, which connects to the local add path, is connected to the output port of the second switch, under the control of the second switch; the signals from the local add path are input to the uplink direction of the backup path through the second switch;

if the node needs to enter express modes, the input port, which connects to the downlink direction of the backup path, is connected to the output port of the second switch, under the control of the second switch; the signals from the uplink direction of the backup path are input to the downlink direction of the backup path through the second switch.

19. The method according to claim 18, further comprising:
controlling the second switch to open the input port, which connects to the local add path, to the output port under the normal working modes.

* * * * *